United States Patent
Nap et al.

(10) Patent No.: US 6,369,769 B1
(45) Date of Patent: Apr. 9, 2002

(54) FLUSH MOUNTED PIT LID ANTENNA

(75) Inventors: Kimbel A. Nap, Glendale; Eric P. Dresselhuys, Milwaukee, both of WI (US)

(73) Assignee: Innovatec Communications, LLC, Butler, WI (US)

( * ) Notice: Subject to any disclaimer, the term of this patent is extended or adjusted under 35 U.S.C. 154(b) by 0 days.

(21) Appl. No.: 09/791,372

(22) Filed: Feb. 23, 2001

Related U.S. Application Data

(60) Provisional application No. 60/184,820, filed on Feb. 25, 2000.

(51) Int. Cl.[7] .................................................. H01Q 1/04
(52) U.S. Cl. ................... 343/719; 343/872; 340/870.02
(58) Field of Search ................................ 343/719, 872, 343/873; 340/870.01, 870.02; H01Q 1/04

(56) References Cited

U.S. PATENT DOCUMENTS

| | | | |
|---|---|---|---|
| 5,298,894 A | 3/1994 | Cerny et al. ........... 340/870.02 |
| 5,659,300 A | 8/1997 | Dresselhuys et al. .. 340/870.02 |
| 6,218,995 B1 * | 4/2001 | Higgins et al. ............. 343/719 |
| 6,300,907 B1 * | 10/2001 | Lazar et al. ................ 343/719 |

* cited by examiner

Primary Examiner—Hoanganh Le
(74) Attorney, Agent, or Firm—Andrus, Sceales, Starke & Sawall, LLP

(57) ABSTRACT

An antenna enclosure and mounting arrangement for transmitting meter-related information from a remotely readable commodity meter positioned within a subterraneous pit to a remote reading station. The antenna arrangement includes an antenna housing having an outwardly tapered support portion that contacts an inwardly tapered support surface formed in the pit lid. When the antenna housing is mounted within the pit lid, the top surface of the antenna enclosure is flush with the top surface of the pit lid, while the antenna contained within the antenna housing is positioned slightly below the top surface of the pit lid.

12 Claims, 5 Drawing Sheets

FLUSH MOUNTED PIT LID ANTENNA

REFERENCE TO CROSS-RELATED APPLICATIONS

This application is based on and claims priority from provisional application Ser. No. 60/184,820 filed Feb. 25, 2000.

BACKGROUND OF THE INVENTION

The present invention relates generally to a transmission antenna for flow meters and, more particularly, to an antenna for an indicating meter positioned beneath the ground such as used by utilities and municipalities to meter consumption of natural gas, water and electricity.

Commodities such as natural gas, water and electricity are routinely delivered to commercial and industrial establishments and residences by piping networks or electrical lines (as the case may be) operated by utility companies and municipalities. For billing purposes, such commodities are "metered" at the point of consumption. That is, the network line or "lateral" extending to the establishment or the residence includes a meter indicating how much of the commodity has been consumed in a period of time and the commodity customer is billed accordingly.

It has been estimated that there are about 600 million utility meters installed worldwide. It has also been estimated that there are about 270 million utility meters in the United States and that about 150–160 million of those meters are used for gas and water. Only a very small percentage of utility meters are configured to be read remotely.

In fact, most such meters are read visually by a person walking on site to actually view and manually record the information displayed on the meter dial. There are a number of disadvantages to this form of meter reading. One is that it is enormously labor-intensive. The overhead costs to a utility or municipality for "walk-by" meter reading are very substantial.

Another disadvantage of such form of meter reading is that the person reading meters is subjected to various forms of hazard, e.g. deep snow, barking (and perhaps biting) dogs and the like. And it is not unheard of that a customer intentionally keeps a ferocious dog in the hope of preventing the meter from being read.

Still another disadvantage is that property owners, especially residential owners, prefer that meter readers not walk on the property. Sometimes, there is a risk that however careful, the meter reader will trample flowers or ornamental shrubs.

In recognition of the disadvantages of walk-by meter reading, meters have been developed which can be read remotely. Such meters are configured as transponders and include a radio transmitter. When the meter is "interrogated" by a radio signal from a remote location, the meter responds by transmitting a signal encoded with the meter reading.

In each of the remote meters, an antenna assembly is connected to the meter to transmit the measured commodity use to the remote reading device. Examples of such systems are shown in U.S. Pat. Nos. 5,298,894 and 5,659,300. In the systems shown in the above mentioned patents, the meter itself is positioned beneath ground in a pit that is covered by a metal pit lid.

In each of these remote meter reading systems, an antenna is shown as extending above the top surface of the pit lid such that the radio frequency signal generated by the antenna is transmitted from above the pit lid. Typically, the pit lid is formed from a metallic material, such as iron, that inhibits the transmission of a radio frequency signal therethrough.

A significant disadvantage of such systems is that the antenna enclosure extends above the pit lid. Since meter pits can be located in a sidewalk, street or yard of individual user, the protruding antenna enclosure can be contacted by either a vehicle or a pedestrian. If the antenna enclosure is contacted by a vehicle, the antenna enclosure can be damaged and must thus be replaced to ensure proper operation.

Therefore, a need exists for an antenna enclosure that is flush mounted with the top surface of the pit lid to prevent the antenna enclosure from being damaged by contact with a vehicle or other device. Further, another object of the present invention is to provide an antenna enclosure and pit lid such that the antenna enclosure can be positioned beneath the pit lid and transmit the radio frequency signals through the pit lid. Further, it is an object of the present invention to configure the pit lid to receive the antenna enclosure of the invention to allow the radio frequency signals generated by the antenna to be transmit to a remote reading device.

SUMMARY OF THE INVENTION

The present invention involves an antenna enclosure and mounting arrangement for mounting a radio frequency antenna on a pit lid. The pit lid covers a pit enclosing a commodity meter.

The antenna enclosure of the present invention includes an antenna housing having a tapered upper support portion. The tapered upper support portion angles outward away from the cylindrical main body of the antenna housing to define an upper surface having a greater diameter than the cylindrical body portion. The upper support portion of the antenna housing contacts a similarly tapered surface that defines an opening within the pit lid.

When the antenna enclosure is mounted within the pit lid, the top surface of the antenna enclosure is flush with the top surface of the pit lid. The actual antenna contained within the antenna enclosure is thus positioned slightly beneath the top surface of the pit lid. When the antenna enclosure is mounted on the pit lid, the tapered surface that defines the opening within the pit lid allows for an increased angle of transmission from the antenna, thereby increasing the effective range of the antenna.

The antenna housing of the invention is secured to the pit lid by a compression fitting that surrounds the cylindrical main body portion and contacts the bottom surface of the pit lid. In this manner, the antenna housing is securely held within the opening formed in the pit lid.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
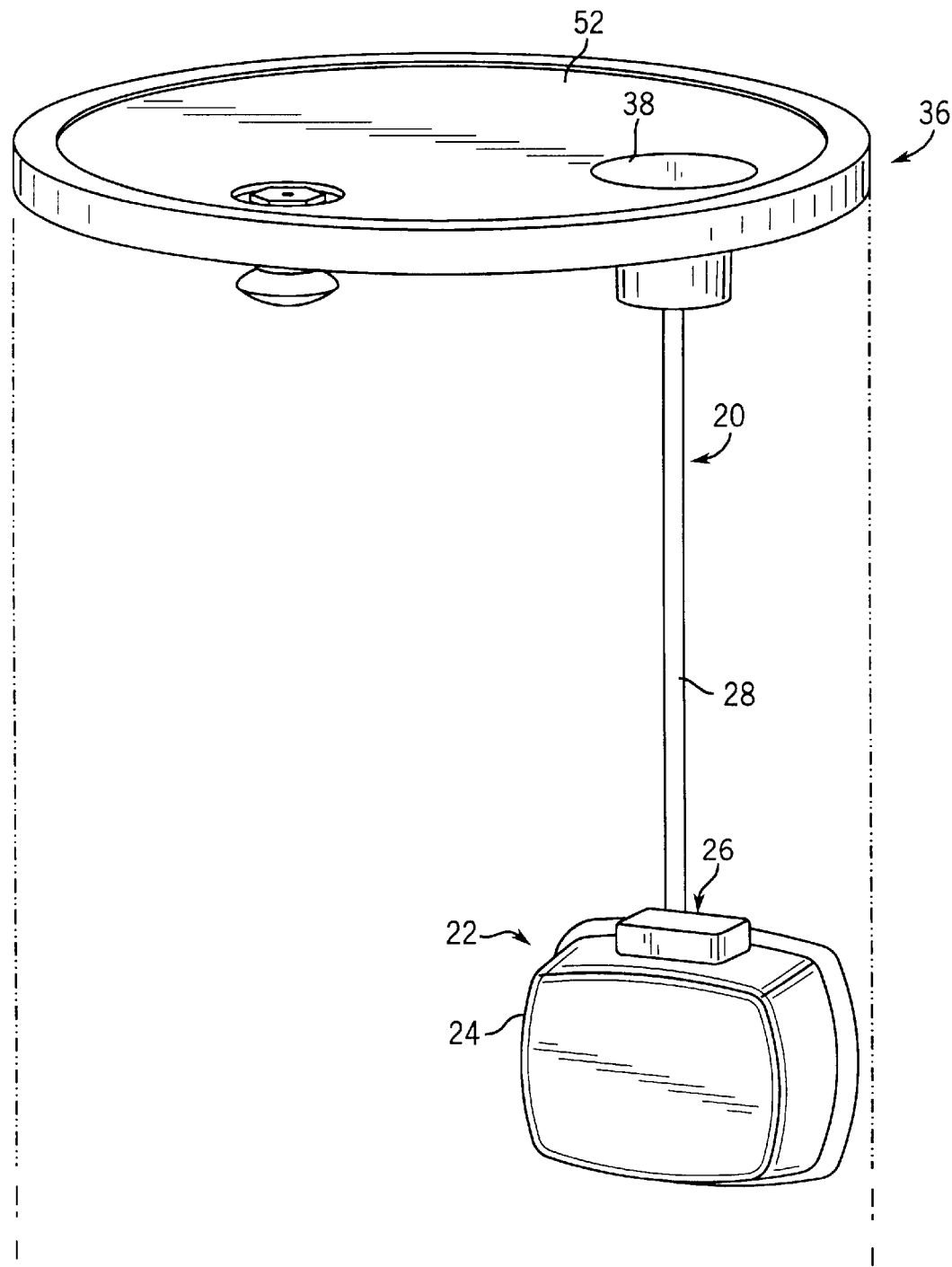
FIG. 1 is a perspective view of a pit lid antenna of the invention as illustrated in use with a conventional pit lid and a sealed commodity meter.
Figure 2:
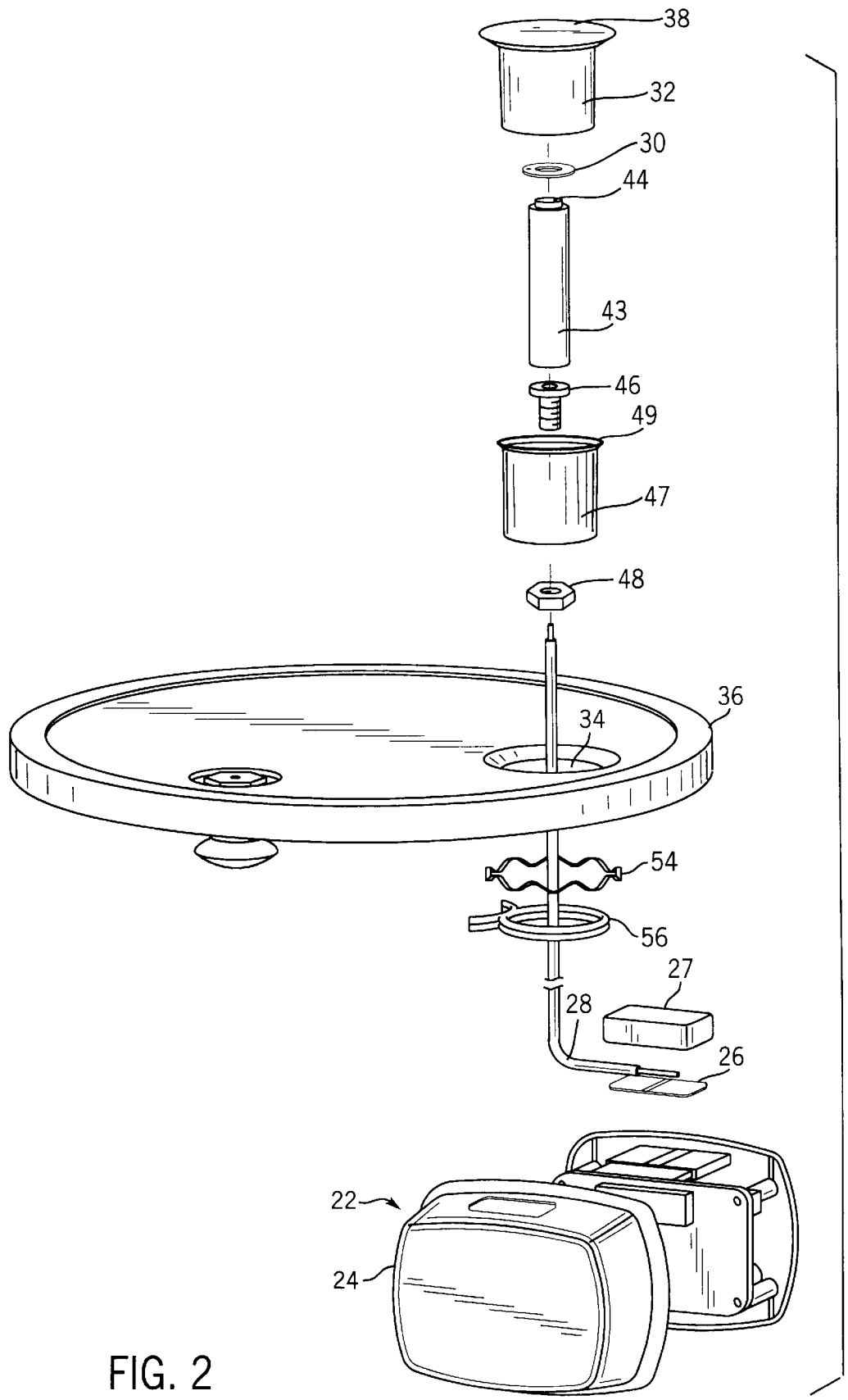
FIG. 2 is an exploded perspective view illustrating the mounting of the pit lid antenna within the pit lid and the inductive coupling between the antenna and the commodity meter.

Referring first to FIG. 1, thereshown is the antenna arrangement 20 of the present invention. The antenna arrangement 20 is used to transmit information from a commodity meter 22 to a remote location, such as a meter reading vehicle or stationary mounted receiving gateway. In the preferred embodiment of the invention, the commodity meter 22 measures the flow of a commodity, such as water or natural gas. The measured amount of commodity flow is transferred out of the sealed meter enclosure 24 to an antenna receptor 26. As can be seen in FIG. 2, the antenna receptor 26 is sealed within a plastic enclosure 27 and receives a transmitted signal from the commodity meter through the plastic outer wall of the meter enclosure 24. Specifically, the antenna receptor 26 is either inductively coupled or capacitively coupled to a transducer contained within the sealed meter enclosure. The specifics of the coupling between the antenna receptor 26 and the transducer 24 are described in commonly owned U.S. Pat. No. 5,659,300, incorporated herein by reference.

Figure 5:
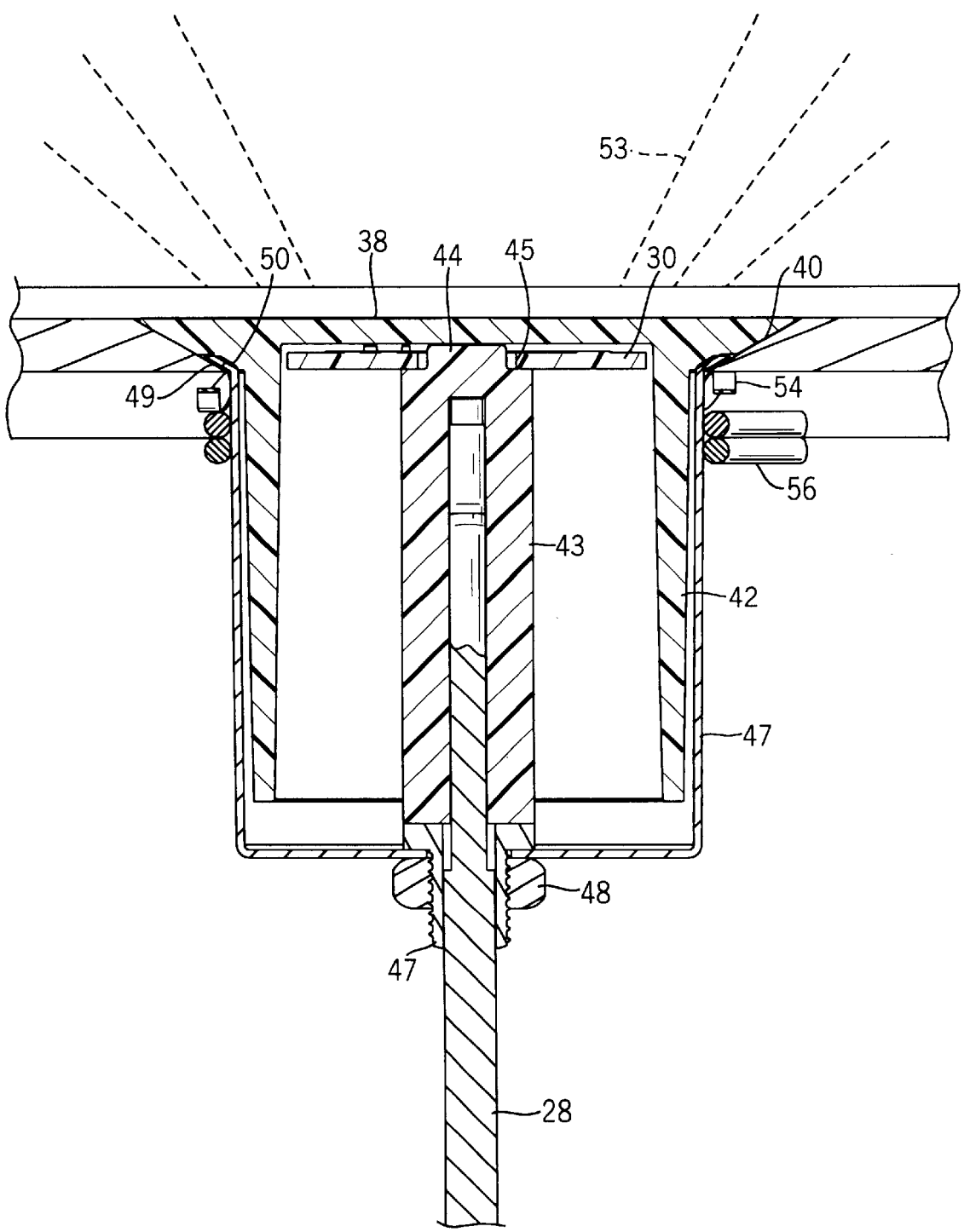
FIG. 5 is a section view illustrating the mounting of the pit lid antenna within the pit lid and the transmission of the radio signals from the antenna.

The antenna receptor 26 is connected by a cable 28 to an antenna 30, as best shown in FIGS. 2 and 5. The antenna 30 is formed along the top surface of a circular circuit board and is configured to transmit a radio frequency signal that can be received by a radio frequency receiving station. The antenna 30 is mounted within an antenna housing 32, which in turn is seated within an opening 34 formed in the pit lid 36. As described in the '300 patent, the pit lid 36 can be formed from metal, plastic, nylon or other material and is positioned above a meter pit in which the commodity meter 22 is located, as shown by the broken lines in FIG. 1. In the preferred embodiment of the invention, the antenna housing 32 is formed from molded plastic or nylon material such that the antenna 30 can transmit the radio frequency signals through a top surface 38 of the housing 32.

Figure 6:
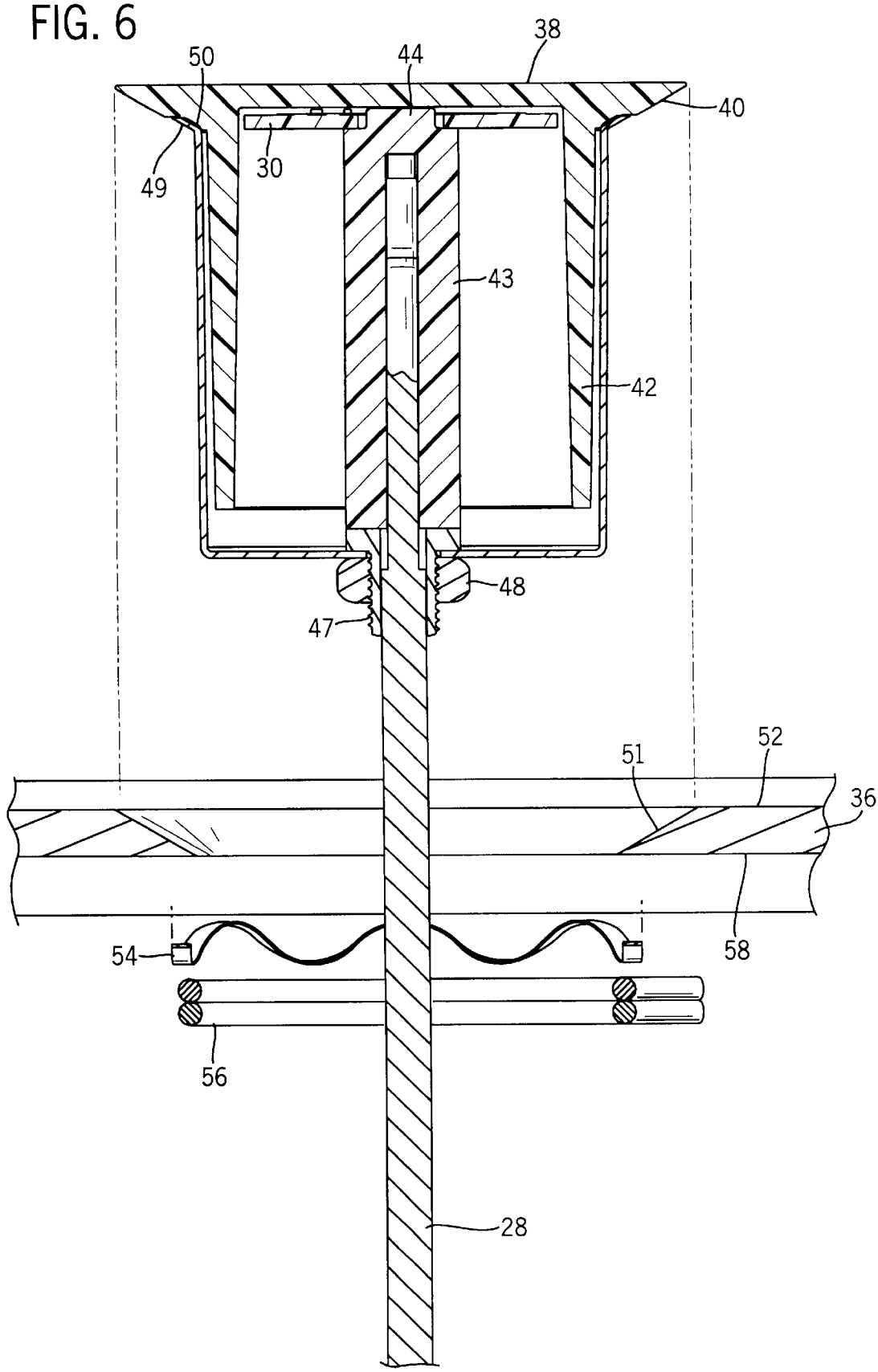
FIG. 6 is a section view illustrating the removal of the pit lid antenna from the pit lid.

Referring now to FIGS. 5 and 6, the antenna housing 32 includes an outwardly tapered upper support portion 40 that is joined to a cylindrical main body portion 42. The support portion 40 is tapered outwardly at an angle of preferably 120°, such that the diameter of the top surface 38 is greater than the diameter of the main body portion 42.

As can be seen in FIG. 5, the antenna 30 is positioned within the upper support portion 40 near the transition between the main body portion 42 and the upper support portion 40. Referring now to FIG. 2, the antenna 30 is formed on a generally circular circuit board and is supported within the antenna housing 38 by a circuit board 43. The cable 28 is soldered to the circuit board 43. The circuit board 43 includes an upper tab 44 that is received within a mating opening 45 formed in the antenna 30, as shown in FIG. 5. Specifically, the circuit board 43 is soldered to the antenna 30 to complete the electrical connection between the cable 28 and the antenna 30.

Referring back to FIGS. 2 and 5, the lower end of the circuit board 43 is supported on a threaded nipple 46. The threaded nipple 46 passes through a central opening formed within an outer can 47 that encloses the antenna housing 32. The outer can 47 is preferably formed from a metallic material and provides a consistent ground for the antenna 30 of the invention. The outer, threaded portion of the nipple 46 receives a nut 48 that securely mounts the can to the housing 42.

The can 47 includes a tapered upper edge 49 that is received within groove 50 formed along the support portion 40 of the antenna housing 32, as shown in FIG. 5. Thus, tightening of the nut 48 along the threaded portion of the nipple 47 causes the tapered upper edge 49 of the can 37 to be tightly received within the groove 50. In addition to acting as a consistent ground for the antenna, the can 47 provides a waterproof enclosure for the circuit board 43 and antenna 30 contained within the antenna housing 32.

Referring now to FIG. 6, the outwardly tapered upper support portion 40 of the antenna housing 32 contacts and engages a mating tapered surface 51 formed in the pit lid 36. As can be seen in FIG. 6, the tapered surface 51 increases in diameter from the bottom surface 58 to the top surface 52 of the pit lid 36. Preferably, the taper of the surface 51 is identical to the taper of the support portion 40 to create a smooth fit.

As can be understood in FIG. 6, the mating tapered surfaces 40 and 51 increase in diameter as they extend away from the antenna 30 such that the antenna 30 can radiate a signal outwardly, as illustrated by the phantom lines 53 in FIG. 5. Since radio frequency signals are unable to pass through metal, the tapered surface 48 of the pit lid 36 allows the antenna 30 to transmit the signals over a much wider broadcast area, specifically when the antenna 30 is used in a metallic pit lid. The tapered surfaces also allow top surface 38 of the antenna housing 32 to be flush with the top surface 52 of the pit lid 36.

As can be seen in FIG. 5, when the antenna housing 32 is mounted within the opening formed in the pit lid 36, the antenna 30 is actually positioned below the top surface 52 of the pit lid. The tapered surface 51 that defines the opening in the pit lid 36 allows the angle of possible broadcast radio frequency waves from the antenna 30 to be increased, as compared to an opening having vertical walls.

Referring now to FIGS. 1 and 5, the mounting arrangement between the pit lid 36 and the antenna housing 32 allows the top surface 38 of the antenna housing 32 to be flush with the top surface 52 of the pit lid 36. In addition to allowing the radio frequency signals to be transmit from the antenna 30, the mating tapered surfaces of the upper support portion 40 and the opening formed in the pit lid 36 allow the top surface 38 of the antenna housing 32 to flush mount with the top surface 52 of the pit lid 36. This feature is unlike the prior art pit lid antenna mounting systems in which the antenna enclosure extended above the top surface 52 of the pit lid. In the prior art systems, the antenna was mounted above the top surface 52 of the pit lid to increase the effective broadcast range for the antenna. In the present system, the tapered portion of the opening formed in the pit lid 36 allows the antenna to transmit signals over the required range.

Figure 3:
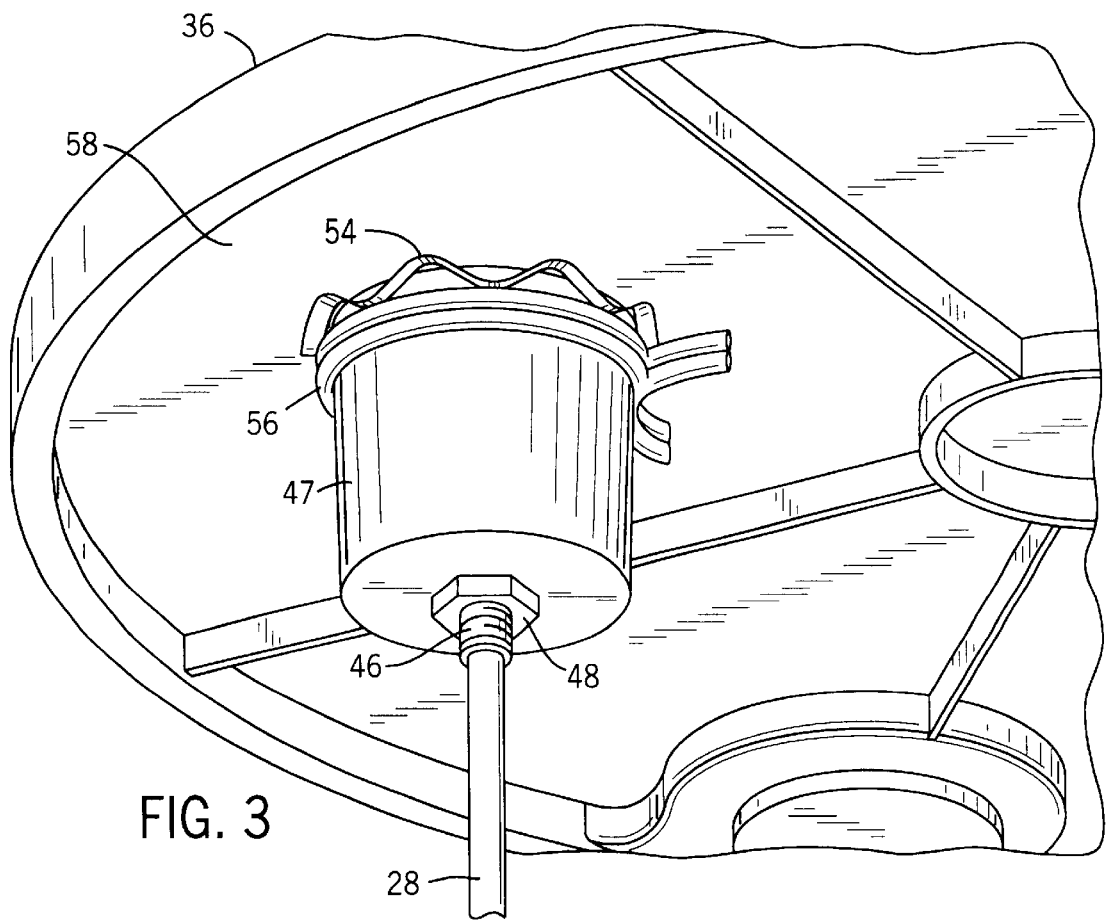
FIG. 3 is a bottom plan view illustrating the positioning of the pit lid antenna with respect to the pit lid.
Figure 4:
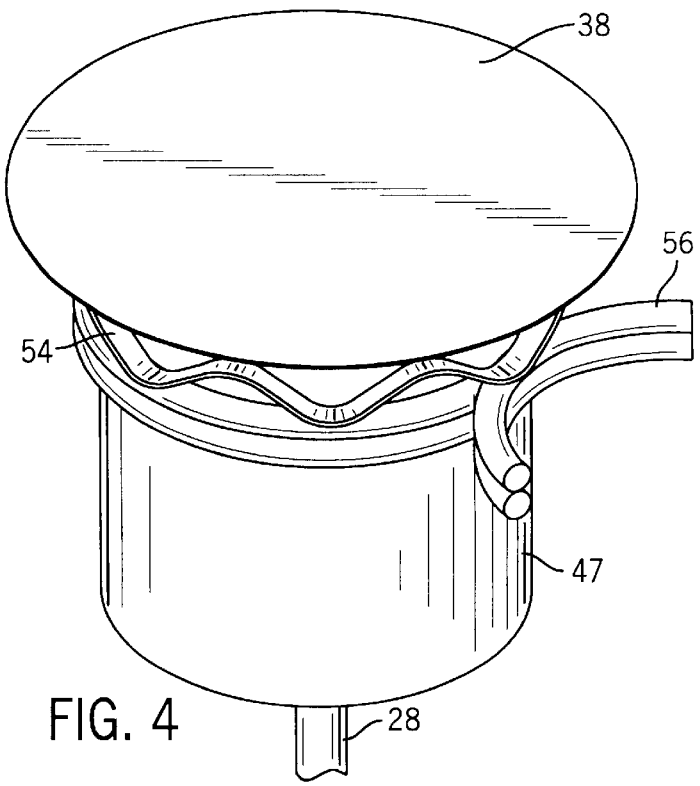
FIG. 4 is a magnified perspective view illustrating the pit lid antenna housing and mounting arrangement.

Referring now to FIGS. 2 and 4, the antenna housing 32 is secured within the opening 34 formed in the pit lid 36 by the combination of a convoluted washer 54 and a compression fitting 56. As can best be seen in FIG. 3, the convoluted washer 54 is positioned between the bottom surface 58 of the pit lid 36 and the compression fitting 56. The compression fitting 56 is a spring element that compresses around the cylindrical outer surface of the can 47 positioned around the antenna housing 32. Although the preferred embodiment of the invention is shown as including the compression fitting 56, it is contemplated by the inventors that any type of device that engages the bottom surface 58 of the pit lid 36 to prevent the antenna housing 32 from moving through the opening 34 formed in the pit lid 36 would be an equivalent to the structure illustrated.

As can be understood in the Figures, the antenna arrangement 10 of the present invention is flush mounted with the top surface 52 of a metallic pit lid 36. The mounting arrangement includes mating tapered surfaces on the antenna housing and the pit lid to allow the antenna to transmit a radio frequency signal over a required broadcast area. In accordance with the invention, the flush-mounted top surface of the antenna housing prevents both contact and damage to the antenna housing when the antenna housing is contained with in a pit lid 36 positioned in an area that receives both foot traffic and vehicle traffic.

Various alternatives and embodiments are contemplated as being within the scope of the following claims particularly pointing out and distinctly claiming the subject matter regarded as the invention.

We claim:

1. An antenna arrangement for radio frequency communication between a commodity meter positioned within a subsurface pit enclosure and a collection unit, comprising:

a pit lid positionable to cover the pit enclosure, the pit lid having a top surface and a mounting opening extending through the pit lid;

an antenna coupled to the commodity meter for transmitting the radio frequency communication signals from the commodity meter to the collection unit; and an antenna housing sized to contain the antenna, the antenna being enclosed within the antenna housing and positioned beneath a top surface of the antenna housing;

wherein the antenna housing passes through and is secured within the mounting opening of the pit lid such that the top surface of the antenna housing is flush with the top surface of the pit lid.

2. The antenna arrangement of claim 1 wherein the pit lid is formed from a metallic material.

3. The antenna arrangement of claim 2 wherein the antenna housing is formed from a plastic material.

4. The antenna arrangement of claim 1 wherein the antenna housing includes an outwardly tapered support portion that contacts a mating tapered surface formed in the pit lid that defines the mounting opening in the pit lid, wherein the interaction between the tapered support portion of the antenna housing and the tapered surface of the pit lid supports the antenna housing within the mounting opening.

5. The antenna arrangement of claim 4 further comprising a compression fitting positioned around the antenna housing and in contact with a bottom surface of the pit lid, such that the pit lid is entrapped between the tapered support portion of the antenna housing and the compression fitting.

6. The antenna arrangement of claim 4 wherein the antenna is positioned within the support portion of the antenna housing and is positioned beneath the top surface of the antenna housing.

7. The antenna arrangement of claim 1 wherein the antenna is inductively coupled to the commodity meter.

8. An antenna arrangement for radio frequency communication between a commodity meter positioned within a subsurface pit enclosure and a collection unit, comprising:

a pit lid positionable to cover the pit enclosure, the pit lid having a top surface and a mounting opening that extends through the pit lid, wherein the mounting opening is defined by a tapered support surface;

an antenna coupled to the commodity meter for radio frequency transmission from the commodity meter to the collection unit; and an antenna housing sized to contain the antenna, the antenna housing including a tapered support portion and a main body portion;

wherein the tapered support portion of the antenna housing engages the tapered support surface of the pit lid such that the antenna housing is supported within the mounting opening of the pit lid such that the top surface of the antenna housing is flush with the top surface of the pit lid.

9. The antenna arrangement of claim 8 wherein the antenna is positioned within the tapered support portion of the antenna housing such that radio frequency signals from the antenna are broadcast over a range of transmission determined by the tapered support surface of the pit lid.

10. The antenna arrangement of claim 8 further comprising a compression fitting positioned around the antenna housing and in contact with a bottom surface of the pit lid such that the pit lid is entrapped between the compression fitting and the tapered support portion of the antenna housing.

11. The antenna arrangement of claim 8 further comprising a sealing member contained within the antenna housing to provide a water-tight seal of the antenna within the antenna housing.

12. The antenna arrangement of claim 8 wherein the pit lid is formed from a metallic material and the antenna housing is formed from a plastic material such that the antenna can transmit radio frequency signals through the top surface of the antenna housing.

* * * * *